(12) United States Patent
Harrer

(10) Patent No.: US 10,710,182 B2
(45) Date of Patent: Jul. 14, 2020

(54) METHOD FOR PRODUCING A PRIMARY MATERIAL FOR A CUTTING TOOL

(71) Applicant: Voestalpine Precision Strip GmbH, Boehlerwerk (AT)

(72) Inventor: Manfred Harrer, Linz (AT)

(73) Assignee: Voestalpine Precision Strip GmbH, Boehlerwerk (AT)

( * ) Notice: Subject to any disclaimer, the term of this patent is extended or adjusted under 35 U.S.C. 154(b) by 113 days.

(21) Appl. No.: 15/508,255

(22) PCT Filed: Sep. 3, 2015

(86) PCT No.: PCT/EP2015/070097
§ 371 (c)(1),
(2) Date: Mar. 2, 2017

(87) PCT Pub. No.: WO2016/034653
PCT Pub. Date: Mar. 10, 2016

(65) Prior Publication Data
US 2017/0282266 A1 Oct. 5, 2017

(30) Foreign Application Priority Data

Sep. 5, 2014 (EP) ..................................... 14183850

(51) Int. Cl.
*B23D 65/00* (2006.01)
*B23K 26/06* (2014.01)
(Continued)

(52) U.S. Cl.
CPC ............ *B23D 65/00* (2013.01); *B23K 15/006* (2013.01); *B23K 26/0619* (2015.10);
(Continued)

(58) Field of Classification Search
CPC .. B23D 65/00; B23K 26/0619; B23K 31/025; C22C 38/23; C22C 38/44; C22C 38/46; C22C 38/58; C22C 38/52
See application file for complete search history.

(56) References Cited

U.S. PATENT DOCUMENTS

| 1,535,096 | A | | 4/1925 | Blum |
| 2,683,923 | A | | 7/1954 | Replogle |
| 4,636,612 | A | * | 1/1987 | Cullen ................. B23Q 35/128 219/124.34 |

(Continued)

FOREIGN PATENT DOCUMENTS

| DE | 10 2010 007 573 A1 | 8/2011 | |
| EP | 1331058 A1 * | 7/2003 | ........... B23K 1/0056 |
| JP | 9-201720 | 8/1997 | |

OTHER PUBLICATIONS

International Preliminary Report on Patentability dated Mar. 9, 2017 in PCT/EP2015/070097 (with English language translation).
(Continued)

*Primary Examiner* — Kenneth E Peterson
*Assistant Examiner* — Liang Dong
(74) *Attorney, Agent, or Firm* — Oblon, McClelland, Maier & Neustadt, L.L.P.

(57) ABSTRACT

A method for producing a primary material for a cutting tool, for example a primary material for a saw blade or a saw band, in which a band-shaped carrier of a metal carrier material and a wire of high-speed steel are continuously brought together along a lateral edge of the band-shaped carrier and transported into a welding device and the band-shaped carrier is welded to the wire along the lateral edge of the carrier to produce a bimetal band. The band-shaped carrier and the edge wire are welded to one another by at (Continued)

least a first welding device, which is arranged on one side of the band-shaped carrier, and at least a second welding device, which is arranged on the opposite side of the band-shaped carrier.

5 Claims, 3 Drawing Sheets

(51) Int. Cl.
*B23K 15/00* (2006.01)
*B23K 26/26* (2014.01)
*B23K 31/02* (2006.01)
*C22C 38/34* (2006.01)
*C22C 38/44* (2006.01)
*C22C 38/46* (2006.01)
*C22C 38/52* (2006.01)
*C22C 38/58* (2006.01)
*B23K 101/20* (2006.01)
*B23K 103/04* (2006.01)

(52) U.S. Cl.
CPC ............ *B23K 26/26* (2013.01); *B23K 31/025* (2013.01); *C22C 38/34* (2013.01); *C22C 38/44* (2013.01); *C22C 38/46* (2013.01); *C22C 38/52* (2013.01); *C22C 38/58* (2013.01); *B23K 2101/20* (2018.08); *B23K 2103/04* (2018.08)

(56) References Cited

U.S. PATENT DOCUMENTS

| | | | | |
|---|---|---|---|---|
| 4,794,231 A | * | 12/1988 | Banas | B23K 26/0604 |
| | | | | 219/121.63 |
| 2004/0245231 A1 | * | 12/2004 | Dull | B23K 9/0256 |
| | | | | 219/137 R |
| 2008/0073330 A1 | * | 3/2008 | Diedrick | B23K 9/32 |
| | | | | 219/133 |
| 2010/0011594 A1 | * | 1/2010 | Wysk | B23D 61/125 |
| | | | | 30/345 |
| 2013/0193121 A1 | | 8/2013 | Alber | |
| 2013/0193124 A1 | * | 8/2013 | Peters | B23K 26/20 |
| | | | | 219/121.63 |
| 2013/0316185 A1 | * | 11/2013 | Evangelista | B32B 15/01 |
| | | | | 428/601 |

OTHER PUBLICATIONS

International Search Report dated Nov. 3, 2015, in PCT/EP2015/070097, filed Sep. 3, 2015.

\* cited by examiner

METHOD FOR PRODUCING A PRIMARY MATERIAL FOR A CUTTING TOOL

The present invention relates to a method for producing a primary material for a cutting tool, in particular a primary material for a saw blade or a saw band.

Cutting tools, such as for example saws for working wood or metal, must meet a whole series of requirements in order to be economically usable. For instance, the saw blade or saw band must consist of a flexible and elastic material, since it must not only be able to absorb the tensile stresses to which the saw band is already exposed as a result of being fitted, but must also additionally be able to withstand the flexural forces to which the saw band or saw blade is subjected during the sawing operation and the corresponding torsional moments and stresses that a saw band undergoes for example during the turning about its longitudinal axis above and below the cutting table and before and after the cutting location. In addition to this there are dynamic loads, which are caused by the engagement of the individual teeth in the material to be worked, and not least thermal loads due to temperatures which, during operation, can reach 600° and more in the region of the teeth and in particular the tips of the teeth. Since the cooling of the band causes this heat to be removed, there are not only thermal loads, but also the formation of temperature gradients, and the associated thermal stresses, which overlay the mechanical stresses and in particular the dynamic stresses.

Since the requirements with regard to toughness and flexural strength of the saw blade or band on the one hand and the hot hardness and wear resistance of the saw on the other hand can only be satisfied insufficiently by a single material, for example a metal or a metal alloy, bands or strips known as bimetal bands or bimetal strips are used with preference as starting components or primary material for cutting tools. Such bimetal bands or strips usually consist of a sheet-like carrier of a carrier material, which has the necessary toughness and flexural strength for the later cutting tool, for example a carrier of low-alloy steels or else of carbon steel. Then, an edge wire of a cutting-edge material, which has a greater wear resistance and a greater hot hardness, is welded on a narrow edge of the sheet-like carrier. A high-speed steel (HSS) is typically used as the cutting-edge material.

The saw manufacturer then produces the saw blade or saw band from this primary material. For this purpose, the tooth profile of the later saw blade or band is fashioned, for example milled or ground out, at the edge of the sheet-like carrier at which the welded-on high-speed steel wire is located. This has the effect of creating teeth with a tip region of high-speed steel, while the rest of the saw blade or band consists of the tough, elastic steel of the sheet-like carrier. Depending on the set of requirements for the saw, the teeth may consist entirely of cutting-edge material, but with preference only the tips of the teeth consist of cutting-edge material, while the foot of the teeth reaches into the sheet-like carrier and consequently consists of the tough, elastic carrier material. This means, however, that the welded connection between the carrier material and the cutting-edge material may typically be located in the region of the teeth.

To produce such a bimetal primary material for a cutting tool, usually a band-shaped carrier of the metal carrier material and a wire of the high-speed steel are continuously brought together along a lateral edge of the band-shaped carrier and transported into a welding device, in which the band-shaped carrier is welded to the wire along the lateral edge of the carrier to produce a bimetal band. Usually used for this is a laser welding head, which is arranged on one side of the assembly to be welded and, in a deep-welding process, produces a filler-free connection between the band-shaped carrier and the edge wire of high-speed steel. As an alternative to laser welding, other welding methods, such as for example electron-beam welding methods, may also be used.

The welded connection between the carrier material and the high-speed steel that is typically located in the region of the teeth may however represent a problem zone from a technical production viewpoint and a metallurgical viewpoint. On the one hand a complete welding of the narrow sides of the band-shaped carrier and the wire is to be achieved, on the other hand undesired elevations of the weld seam or formation of a disturbing raised weld bead are to be avoided. Moreover, the weld seam or the mixed region of the various materials that is formed during the welding typically has little toughness and a great deformation resistance.

In particular when a high-speed steel is used as the cutting-edge material, from a manufacturing viewpoint the formation of a weld seam elevation or weld bead cannot be prevented by production techniques. Such a weld bead is not only a hindrance already during further processing but is also problematic during later use as a saw band or saw blade on account of the increased friction with the material to be worked. It is therefore usual after the welding of the carrier material to the high-speed steel wire to roll the bimetal band created, or adjust its thickness, in what is known as a dressing process. However, the raised regions of the weld beads on the surfaces of the band with increased deformation are thereby pressed into the predetermined band cross section. As a result, contractions of the material on both sides of the rolled-in regions of the volume of material in the band may be caused, which leads to the formation of longitudinal scores on both sides of the deformed weld beads in the band. The formation of such longitudinal scores due to the dressing is shown for example in FIGS. 1 to 3 of Austrian patent specification AT 411 581 B. Such reworking of the weld seam is also described in German patent application DE 19501442 A1. To avoid such longitudinal scores, it is proposed in this document to remove the elevated regions of the weld seam or the weld bead after the welding by machining the surface of the bimetal band, for example by grinding.

This achieves the effect that, in the subsequent dressing processes, no protruding material is pressed any longer into the cross section of the bimetal band, and so no longitudinal scores occur any longer either.

These longitudinal scores are unwanted because they have the disadvantage that, after the fashioning of the gaps between the teeth and the deflection of individual tooth segments out of the plane of the later saw blade or band (setting), the scores in the region of the teeth may bring about increased stress in the root of the groove, giving rise to the risk of initiating cracks, which during practical operation of the saw may cause breakouts of the tips of the teeth and shortening of the lifetime of the saw. However, the machining of the bimetal band proposed in AT 411 581 B makes the production process more expensive. Especially in the case of relatively simple saw blades and bands, there is such great competitive pressure however that measures that increase the production costs have to be avoided wherever possible.

The present invention therefore addresses the technical problem of providing a method for producing a primary material for a cutting tool of the type described above that makes it possible in a low-cost way to produce bimetal bands with which the described formation of scores can be avoided without subsequent machining of the welded connection, in order that high-quality saw blades or saw bands can be produced in a low-cost way.

This technical problem is solved by the method of the present claim 1. Advantageous developments of the method according to the invention are the subject of the dependent method claims.

The invention accordingly relates to a method for producing a primary material for a cutting tool, in particular a primary material for a saw blade or a saw band, in which a band-shaped carrier of a metal carrier material and a wire of high-speed steel are continuously brought together along a lateral edge of the band-shaped carrier and transported into a welding device and the band-shaped carrier is welded to the wire along the lateral edge of the carrier to produce a bimetal band, the method according to the invention being characterized in that the band-shaped carrier and the edge wire are welded to one another by at least a first welding device, which is arranged on one side of the band-shaped carrier, and at least a second welding device, which is arranged on the opposite side of the band-shaped carrier.

The invention is based on the idea that, by the use of at least two welding devices, which are arranged on opposite sides of the assembly to be welded comprising the band-shaped carrier and the HSS wire, the thermal energy to be introduced by the individual welding devices can be reduced drastically, so that welding of the composite is possible with a smaller amount of energy applied to the respective surface. In this way, the formation of a weld seam elevation or a weld bead can be reduced significantly and can be made to be comparable on both sides of the band.

Although double-sided welding methods for sheets or bands have long been known from the prior art, such methods are usually used in technologically sophisticated processes, such as the welding of laminated composite materials, coated materials or sheets of materials that are more demanding from a welding viewpoint, such as for example light metal alloys (cf. for example DE 10 2010 007 573 B4 or DE 101 31 883 B4). However, a person skilled in the art would not consider such a method for the production of bimetal bands for saw blades or saw bands, since the use of at least two welding devices arranged on opposite sides of the sheet-like carrier is technologically more complex, and consequently more expensive, than the one-sided welding methods previously used in the production of bimetal bands. A person skilled in the art would therefore expect that the bimetal bands produced in this way can no longer be offered at competitive prices for the production of saw blades.

However, it has surprisingly been found that, in spite of the more complex welding method, ultimately a cost reduction is possible, since on the one hand the productivity can be increased and on the other hand it has surprisingly been demonstrated that, with methods according to the invention, the weld seam elevations and the formation of weld beads are so minor that, even without subsequent machining of the welded connection, longitudinal scores no longer occur in the later working steps, such as the dressing of the band, and so high-quality saw blades and bands can be created even without the welded connection being ground. This surprising result was not foreseeable from the available prior art relating to the double-sided welding of metal sheets or bands. Moreover, a reduction of the weld seam stresses and a reduction of the hot cracks in difficult combinations of materials can be achieved in this way. Furthermore, new products in which the upper beads no longer have to be leveled can be produced.

This assessment is also not invalidated for example by the fact that U.S. Pat. No. 2,683,923 A, published back in 1954, describes a complex method for producing composite metal bands for saw blades in which, in one embodiment, double-sided welding methods (arc welding, submerged-arc welding), are also used, these welding methods however always working with fillers. Moreover, by contrast with the present invention, not high-speed steel but a chromium steel with a high carbon content is used in the specific case in which welding is carried out on both sides. Low-cost production is not possible however with the method described in the U.S. Pat. No. 2,683,923 A.

The production of a saw blade is described in the document U.S. Pat. No. 1,535,096 A, a wire of high-speed steel being welded to a band-shaped carrier. The method used there is a resistance welding method, in which opposing rollers serve as electrodes, that is to say a welding device is, as it were, divided between the two sides of the band-shaped carrier and the electric current flowing between the electrodes uniformly heats up the material lying in between. By contrast with the present invention, it is not the case therefore that a first welding device is arranged on one side of the band-shaped carrier and a second welding device is arranged on the opposite side.

The method according to the invention has further advantages:

On account of the welding operation taking place on both sides of the sheet-like carrier, a much more symmetrical formation of the weld seam is obtained. This results in a more uniform behavior during the later setting of the teeth of the saw blade or the saw band, which in turn makes a more uniform introduction of the cutting forces into the saw band possible during the sawing.

Furthermore, by reducing the welding depth, preferably to half the material thickness, the physical limits of deep welding can be avoided, and so for example the width of the weld seam can be reduced. Especially for the production of small toothing variants, a small weld seam width is of great importance, because on the one hand the weld seam should always lie in the region of the teeth and on the other hand the greatest possible HSS fraction is required, because, with a correspondingly great level of HSS, the length of the individual weld seam per tooth becomes correspondingly long, and so the shearing stability with respect to breaking out of the teeth is positively influenced.

These advantages are also not suggested by U.S. Pat. No. 2,683,923 A. The aim of the technology described there is rather that of creating an intermediate region of a considerable width, which in turn requires use of fillers in the welding zone. Although it is also described in U.S. Pat. No. 2,683,923 A that a weld seam with only little weld elevation can be created, it is attributed there to the welding method used, irrespective of whether welding is carried out on one side or both sides.

The at least two welding devices provided in the method according to the invention may lie directly opposite one another or else be offset with respect to one another in the transporting direction of the band-shaped carrier. In the latter case, it is advantageously prevented that the welding devices can damage one another. If the two welding devices lie directly opposite one another, alignment of the welding devices can also be arranged in such a way that the energy is not introduced perpendicularly but slightly at an angle to the surface of the carrier, and so mutual damage can also be largely ruled out in this case.

The method according to the invention may be carried out with a wide variety of welding devices, but they are preferably electron-beam welding devices or, with particular preference, laser welding devices.

As compared with the resistance welding method described in U.S. Pat. No. 1,535,096 A, the laser welding preferred according to the invention has numerous advantages: Locally high energy intensities are used for the deep laser welding process that is used with preference, as a result of which only a very small region is heated up and melted, especially in comparison with resistance welding. This has the advantage that there is no or only very little distortion of the component as a whole after the connecting process. Furthermore, the local introduction of the energy intensity means that the laser radiation can be absorbed well by the melt in the connecting zone and produces very little, and in particular uniform, weld seam elevation. An irregular weld seam elevation or a weld seam depression, i.e. a connecting zone that is not filled, would be unsuitable for the intended use as a saw blade or saw band, because such a defect causes the risk of a tooth breaking out. Furthermore, the localized, high amount of energy introduced during the laser welding process in comparison with resistance welding means that much higher welding speeds can be achieved, whereby the productivity is increased significantly. Especially by contrast with the specific form of resistance welding that is described in U.S. Pat. No. 1,535,096 A, during the laser welding there is no relative movement between the wire and the carrier material and no deformation in the width or elongation of the wire during the pressing after the heating.

According to a preferred embodiment of the method according to the invention, the power of the welding devices is controllable in an open-loop and/or closed-loop manner. For example, the thermal distortion that frequently occurs during welding on account of transverse shrinkage and the resultant angling, known as angular distortion, of the welded assembly comprising the carrier and the wire can be detected, and the introduction of energy from the first and second welding devices lying opposite one another can be adapted in such a way that the angular distortion is minimized. In other words, the resultant transverse shrinkage of the second welding device is made to match the transverse shrinkage of the first welding device.

On account of the surprisingly little weld seam elevation that occurs in the case of the method according to the invention when welding the carrier to the HSS wire, it is possible to dispense with machining of the bimetal band before a possibly intended dressing of the band. For individual applications, it may even be possible to dispense with dressing of the bimetal band, which leads to a particularly low-cost production method.

The invention finally also relates to a saw blade or saw band which consists of a primary material that has been produced by the method according to the invention. The cutting part of the saw blade or band in this case consists of a high-speed steel (HSS).

For a saw blade or saw band, a carrier material with the following composition is used (figures given in % by weight):

| | |
|---|---|
| carbon (C) | 0.2 to 1.5 |
| silicon (Si) | up to 2.0 |
| manganese (Mn) | up to 2.0 |
| chromium (Cr) | up to 7.0 |
| molybdenum (Mo) | up to 3.0 |

-continued

| | |
|---|---|
| nickel (Ni) | up to 1.5 |
| vanadium (V) | up to 0.6 |
| tungsten (W) | up to 5.0 | iron (Fe) and smelting-induced accompanying elements and impurities as the remainder;
and this carrier material is combined with a cutting-edge material of the following composition (figures given in % by weight):

| | |
|---|---|
| carbon (C) | 0.5 to 2.5 |
| silicon (Si) | up to 1.5 |
| manganese (Mn) | up to 0.8 |
| chromium (Cr) | 2 to 6.0 |
| molybdenum (Mo) | up to 11.0 |
| vanadium (V) | up to 10.0 |
| tungsten (W) | up to 20.0 |
| cobalt (Co) | up to 15.0 | iron (Fe) and smelting-induced accompanying elements and impurities as the remainder;
the proportion of the elements Si+V+Mo+W/2 being >5% by weight.

The invention is explained in more detail below with reference to an exemplary embodiment that is represented in the accompanying drawing, in which.

Figure 1:
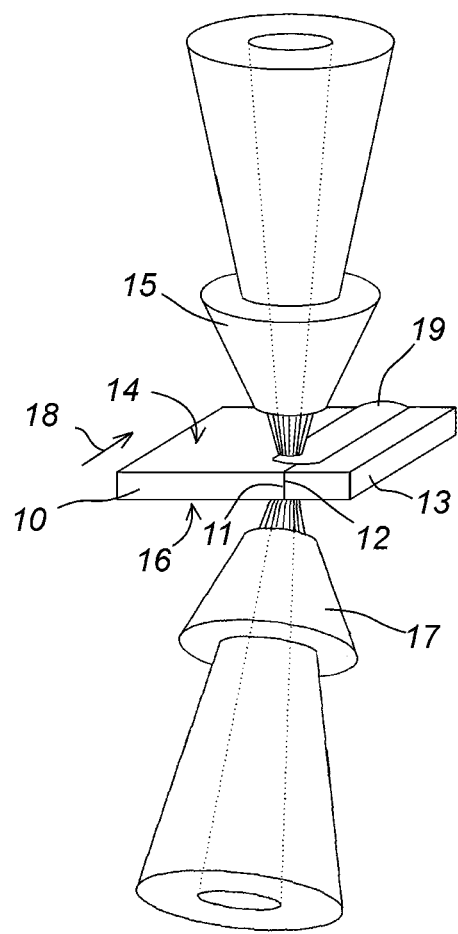
FIG. 1 shows a schematic representation of the welding of a band-shaped sheet-like carrier with an HSS wire by the method according to the invention.

In FIG. 1, an embodiment of the method according to the invention for producing a primary material for a cutting tool is schematically represented by way of example. A first sheet-like carrier 10 can be seen, which is arranged with its edge 11 on the edge 12 of an HSS wire 13 formed as an edge wire. In the example represented, the sheet-like carrier and the HSS wire have been represented as short portions for the sake of better overall clarity. They are however preferably continuous strips, which are for example unwound from reels that are likewise not shown here.

Arranged above the upper side 14 of the band-shaped carrier is a first laser welding device 15 and arranged underneath the underside 16 of the band-shaped carrier is a second laser welding device 17. The sheet-like carrier 10 and the HSS wire 13 are transported through under the laser welding devices 15 and 17 in the direction indicated by the arrow 18. A welded connection 19 is produced between the sheet-like carrier 10 and the HSS wire 13.

Figure 2:
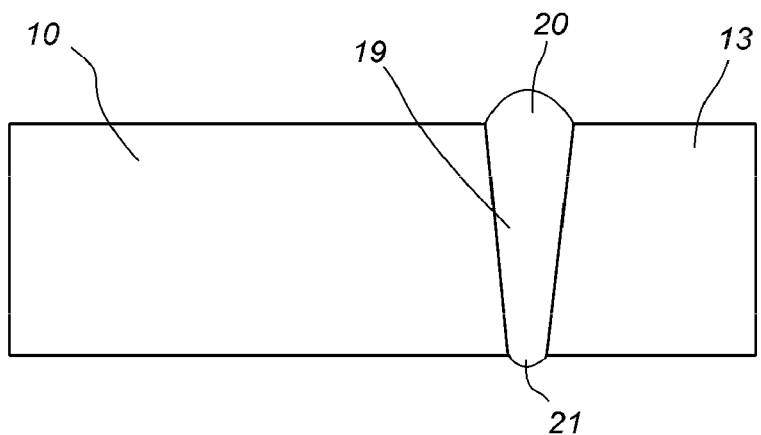
FIG. 2 shows a schematic cross section of a welded connection produced by a conventional method of the prior art.

FIG. 2 shows a schematic cross section of a welded connection produced by a conventional method of the prior art. The welded connection 19 shown in FIG. 1 has been created between the carrier 10 and the HSS wire 13 by means of a laser beam device acting only on the upper side of the carrier. Both the formation of a pronounced upper bead 20 and the formation of a somewhat less pronounced lower bead 21 can be seen. Furthermore, the welded connection has a slightly wedge-shaped profile, and is therefore wider on the upper side than on the underside.

Figure 3:
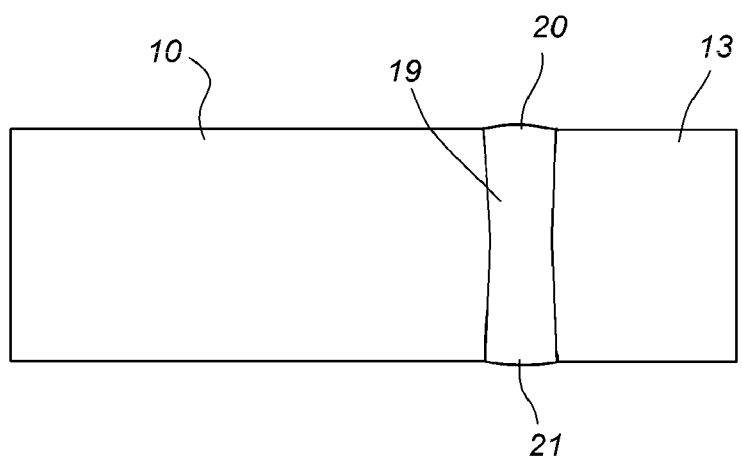
FIG. 3 shows a schematic cross section of a welded connection produced by the method according to the invention.

By contrast with this, in FIG. 3 a schematic cross section of a welded connection 19 produced by the method according to the invention is shown. It can be seen that on the one hand both the upper bead 20 and the lower bead 21 are far less pronounced, and so scores are not expected to be formed in a subsequent dressing process. Furthermore, the weld seam is formed much more symmetrically over the cross section.

Figure 4:
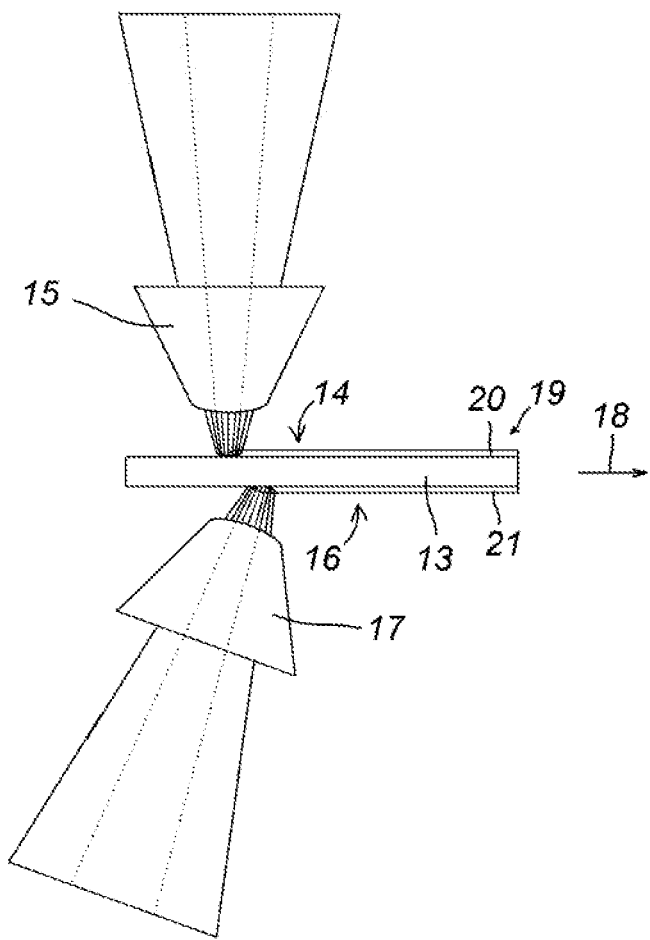
FIG. 4 shows a side view of the schematic representation shown in FIG. 1.

In FIG. 4, another view of the embodiment of the method according to the invention for producing a primary material for a cutting tool is schematically represented by way of example. FIG. 4 is essentially a side-view of the arrangement shown in FIG. 1. By means of the different viewing angle shown in FIG. 4, the offset between the welding devices in a transporting direction of the band-shaped carrier is clearly visible.

The invention claimed is:

1. A method for producing a primary material for a cutting tool, or a primary material for a saw blade or a saw band, comprising:
    bringing together continuously a band-shaped carrier of a metal carrier material and an edge wire of a high-speed steel along a lateral edge of the band-shaped carrier;
    transporting the brought together band-shaped carrier and the edge wire into a welding device, said welding device comprising at least a first laser welding device and a second laser welding device;
    welding the band-shaped carrier to the edge wire along the lateral edge of the carrier to produce a bimetal band;
    detecting angular distortion and weld seam elevation of the welded band-shaped carrier and the edge wire; and
    setting a power of the first and second laser welding devices using closed-loop control based upon the detected angular distortion and weld seam elevation to minimize the angular distortion and the weld seam elevation,
    wherein the band-shaped carrier and the edge wire are welded to one another by at least said first laser welding device arranged on one side of the band-shaped carrier, and at least said second laser welding device arranged on the opposite side of the band-shaped carrier, said first laser welding device and said second laser welding device being offset with respect to one another in a transporting direction of the band-shaped carrier.

2. The method as claimed in claim 1, wherein a weld seam created between the carrier and the edge wire is not machined before a dressing of the bimetal band.

3. A saw blade or saw band, wherein the saw blade or saw band comprises a primary material produced by a method as claimed in claim 1.

4. The saw blade or saw band as claimed in claim 3, wherein the carrier material has the following composition (figures given in % by weight):

| carbon (C) | 0.2 to 1.5 |
| --- | --- |
| silicon (Si) | up to 2.0 |
| manganese (Mn) | up to 2.0 |
| chromium (Cr) | up to 7.0 |
| molybdenum (Mo) | up to 3.0 |
| nickel (Ni) | up to 1.5 |
| vanadium (V) | up to 0.6 |
| tungsten (W) | up to 5.0 | iron (Fe) and smelting-induced accompanying elements and impurities as the remainder.

5. The saw blade or saw band as claimed in claim 3, wherein the high-speed steel has the following composition (figures given in % by weight):

| carbon (C) | 0.5 to 2.5 |
| --- | --- |
| silicon (Si) | up to 1.5 |
| manganese (Mn) | up to 0.8 |
| chromium (Cr) | 2 to 6.0 |
| molybdenum (Mo) | up to 11.0 |
| vanadium (V) | up to 10.0 |
| tungsten (W) | up to 20.0 |
| cobalt (Co) | up to 15.0 | iron (Fe) and smelting-induced accompanying elements and impurities as the remainder, and
wherein the proportion of the elements Si+V+Mo+W/2 being >5% by weight.

* * * * *